(12) United States Patent
Hiramatsu et al.

(10) Patent No.: US 11,560,179 B2
(45) Date of Patent: Jan. 24, 2023

(54) COLLISION ENERGY ABSORBING APPARATUS

(71) Applicant: TOYOTA JIDOSHA KABUSHIKI KAISHA, Toyota (JP)

(72) Inventors: Koichi Hiramatsu, Toyota (JP); Koji Kurozumi, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 17/330,553

(22) Filed: May 26, 2021

(65) Prior Publication Data

US 2021/0394831 A1 Dec. 23, 2021

(30) Foreign Application Priority Data

Jun. 23, 2020 (JP) .............................. JP2020-107570

(51) Int. Cl.
| | | |
|---|---|---|
| *B62D 21/15* | (2006.01) | |
| *B60R 19/02* | (2006.01) | |
| *B60R 19/03* | (2006.01) | |
| *F16F 7/12* | (2006.01) | |
| *B60R 19/24* | (2006.01) | |
| *B60R 19/26* | (2006.01) | |

(52) U.S. Cl.
CPC ............ *B62D 21/15* (2013.01); *B60R 19/023* (2013.01); *B60R 19/03* (2013.01); *B60R 19/24* (2013.01); *B60R 19/26* (2013.01); *B60R 2019/026* (2013.01); *B60R 2019/242* (2013.01); *B60R 2019/247* (2013.01); *F16F 7/125* (2013.01); *F16F 7/127* (2013.01)

(58) Field of Classification Search
CPC .......... B62D 21/15; F16F 7/125; F16F 7/127; B60R 19/023; B60R 19/03; B60R 19/24; B60R 19/26; B60R 2019/026; B60R 2019/242; B60R 2019/247

USPC ..................................................... 296/187.03
See application file for complete search history.

(56) References Cited

U.S. PATENT DOCUMENTS

| 8,746,763 B2 * | 6/2014 | Wavde ..................... B60R 19/34 |
| | | 293/133 |
| 2007/0187960 A1 * | 8/2007 | Evans ..................... B60R 19/18 |
| | | 293/133 |

FOREIGN PATENT DOCUMENTS

| JP | 2011-063191 A | 3/2011 |
| JP | 2012-087849 A | 5/2012 |

* cited by examiner

*Primary Examiner* — D Glenn Dayoan
*Assistant Examiner* — Dana D Ivey
(74) *Attorney, Agent, or Firm* — Sughrue Mion, PLLC

(57) ABSTRACT

The present disclosure provides a collision energy absorbing apparatus capable of suppressing a peak load at the initial stage of a collision and a load drop immediately after it. The collision energy absorbing apparatus is an apparatus that absorbs collision energy, the apparatus being mounted on a vehicle and including a pressure member, an absorbing member, and a guide part that guides, a moving direction of the pressure member, in which a hole through which the pressure member guided and moved by the guide part enters is formed in the absorbing member, and in an event of a collision, the pressure member is guided by the guide part and a tip part of the pressure member enters the hole formed in the absorbing member while shearing an inner wall of the hole, to thereby absorb collision energy.

10 Claims, 17 Drawing Sheets

|  | EXAMPLE 1 | EXAMPLE 2 | EXAMPLE 3 |
|---|---|---|---|
| PRESSURE MEMBER | SUPER HARD MATERIAL (CEMENTED CARBIDE) | | |
| ABSORBING MEMBER | S10C | S25C | S35C |
| ALIGNMENT MEMBER | S10C | S25C | S35C |
| DIAMETER D1 OF PRESSURE MEMBER | 46.8mm | | |
| DIAMETER D2 OF TAPERED HOLE (ON REAR END SURFACE SIDE) | 44.8mm | | |
| DIAMETER D3 OF TAPERED HOLE (ON FRONT END SURFACE SIDE) | 36.54mm | | |
| DIAMETER D4 OF ABSORBING MEMBER | 55.2mm | | |
| MAXIMUM DIAMETER D5 OF ALIGNMENT MEMBER | 59.5mm | | |
| AXIAL LENGTH L1 OF ABSORBING MEMBER | 34mm | | |
| AXIAL LENGTH L2 OF COLLISION ENERGY ABSORBING APPARATUS | 74mm | | |

Fig. 5

|  | COMPARATIVE EXAMPLE | EXAMPLE 1 | EXAMPLE 2 | EXAMPLE 3 |
|---|---|---|---|---|
| VOLUME (cc) | 1,500 | 206 | | |
| MASS (g) | 2,070 | 1,065 | | |
| ABSORBED ENERGY (J) | 9,148 | 8,000 | 8,800 | 10,270 |
| ABSORBED ENERGY PER VOLUME (J/cc) | 6.10 | 38.83 | 42.72 | 49.85 |
| ABSORBED ENERGY PER MASS (J/g) | 4.42 | 7.51 | 8.26 | 9.64 |

Fig. 6

COLLISION ENERGY ABSORBING APPARATUS

CROSS REFERENCE TO RELATED APPLICATIONS

This application is based upon and claims the benefit of priority from Japanese patent application No. 2020-107570, filed on Jun. 23, 2020, the disclosure of which is incorporated herein in its entirety by reference.

BACKGROUND

The present disclosure relates to a collision energy absorbing apparatus and, in particular, to a collision energy absorbing apparatus capable of suppressing an increase in a peak load at the initial stage of a collision and a load drop immediately after it.

For example, Japanese Unexamined Patent Application Publication No. 2011-63191 discloses a collision energy absorbing apparatus (a clash box) having a hollow part (an inner cylinder) that is formed between a reinforcing plate having a hat-shaped cross section and an inner surface of a rectangular steel cylinder (an outer cylinder) by providing the reinforcing plate on the inner surface of the rectangular steel cylinder, the hollow part having a diameter smaller than that of the rectangular steel cylindrical body, in order to suppress a load drop immediately after a peak load at the initial stage of a collision without increasing the peak load at the initial stage of the collision.

SUMMARY

In a collision energy absorbing apparatus, there is a demand to suppress a peak load at the initial stage of a collision and prevent a load drop immediately after it (see paragraph [0020] of Japanese Unexamined Patent Application Publication No. 2011-63191). However, the collision energy absorbing apparatus disclosed in Japanese Unexamined Patent Application Publication No. 2011-63191 has a problem that it is not possible to suppress the peak load at the initial stage of a collision and a load drop immediately after it. FIG. 17 shows FIG. 14 disclosed in Japanese Unexamined Patent Application Publication No. 2011-63191, showing a load variation curve of the collision energy absorbing apparatus disclosed therein.

Referring to FIG. 17, it can be seen that the collision energy absorbing apparatus disclosed in Japanese Unexamined Patent Application Publication No. 2011-63191 cannot suppress the peak load at the initial stage of a collision and a load drop immediately after it (see EXAMPLE 1 OF PRESENT INVENTION and EXAMPLE 2 OF PRESENT INVENTION described in FIG. 17).

The present disclosure has been made to solve such a problem and an object thereof is to provide a collision energy absorbing apparatus capable of suppressing a peak load at the initial stage of a collision and a load drop immediately after it.

A first exemplary aspect is a collision energy absorbing apparatus configured to absorb collision energy, the collision energy absorbing apparatus being mounted on a vehicle and including a guide part that guides a pressure member, an absorbing member, and a moving direction of the pressure member, in which a hole through which the pressure member guided and moved by the guide part enters is formed in the absorbing member, and in an event of a collision, the pressure member is guided by the guide part and a tip part of the pressure member enters the hole formed in the absorbing member so as to shear an inner wall of the hole, to thereby absorb collision energy.

By this structure, it is possible to provide a collision energy absorbing apparatus capable of suppressing a peak load at the initial stage of a collision and a load drop immediately after it.

This is because, at a time of collision, a pressure member is guided by a guide part, and the tip part of the pressure member enters a hole formed in an absorbing member so as to shear an inner wall of the hole, to thereby absorb collision energy.

It should be noted that the collision energy absorbing apparatus may further include an alignment member, in which the absorbing member is provided between the alignment member and the pressure member, and a diameter of the pressure member may be set to be larger than a diameter of the hole so that the pressure member abuts an area around the hole of the absorbing member.

Further, the guide part may be a guide rod provided in the alignment member, and a guide hole into which the guide rod is fitted may be formed in the pressure member.

Further, the guide part is a guide rod provided in the pressure member, and a guide hole into which the guide rod is fitted may be formed in the alignment member.

Further, a central axis of the guide hole formed in the pressure member, a central axis of the hole formed in the absorbing member, and a central axis of the guide rod may coincide with one another.

Further, a recess part as the guide part into which the tip part of the pressure member is fitted may be provided in the hole, and the tip part of the pressure member may be fitted into the recess part in a state in which a front end surface of the pressure member abuts a bottom surface of the recess part.

Further, a central axis of the pressure member and the central axis of the hole formed in the absorbing member may coincide with each other.

Further, the hole may be a tapered hole which narrows in a frustum shape from a side of the absorbing member facing the pressure member to a side of the absorbing member opposite to the side thereof facing the pressure member.

Further, it is desired that at least the tip part of the pressure member be made of a material harder than the material of the absorbing member.

Further, the pressure member may include the tip part and a pressure member body to which the tip part is attached.

According to the present disclosure, it is possible to provide a collision energy absorbing apparatus capable of suppressing a peak load at the initial stage of a collision and a load drop immediately after it.

The above and other objects, features and advantages of the present disclosure will become more fully understood from the detailed description given hereinbelow and the accompanying drawings which are given by way of illustration only, and thus are not to be considered as limiting the present disclosure.

BRIEF DESCRIPTION OF DRAWINGS

FIG. 5 is a table summarizing the materials, sizes, and the like of the collision energy absorbing apparatus 10 and its components used in Examples 1 to 3;

FIG. 6 is a table summarizing the volume and the like of the collision energy absorbing apparatus 10 used in a comparative example and Examples 1 to 3;

DESCRIPTION OF EMBODIMENTS

A collision energy absorbing apparatus 10 according to an embodiment of the present disclosure will be described hereinafter with reference to the accompanying drawings. The same components are denoted by the same reference signs throughout the drawings, and redundant descriptions will be omitted.

The collision energy absorbing apparatus 10 is an apparatus that is attached to a vehicle such as an automobile and absorbs collision energy.

Figure 1:
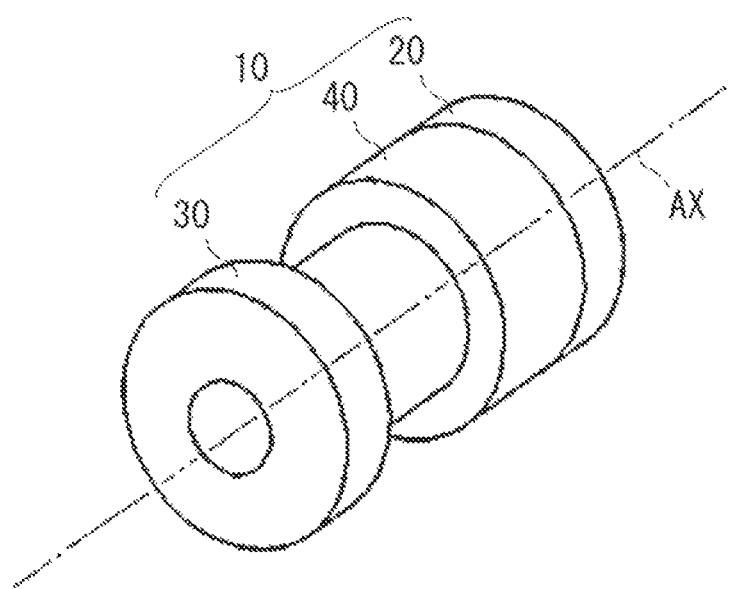
FIG. 1 is a perspective view of a collision energy absorbing apparatus 10.
Figure 2:
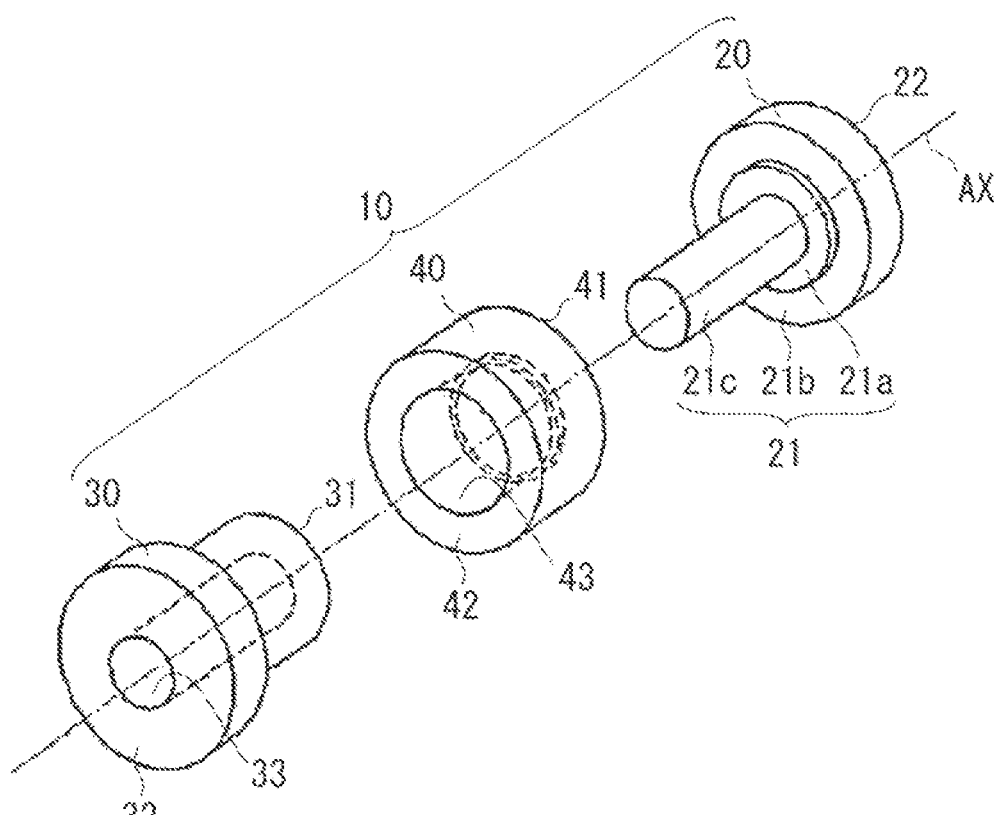
FIG. 2 is an exploded perspective view of the collision energy absorbing apparatus 10.
Figure 3:
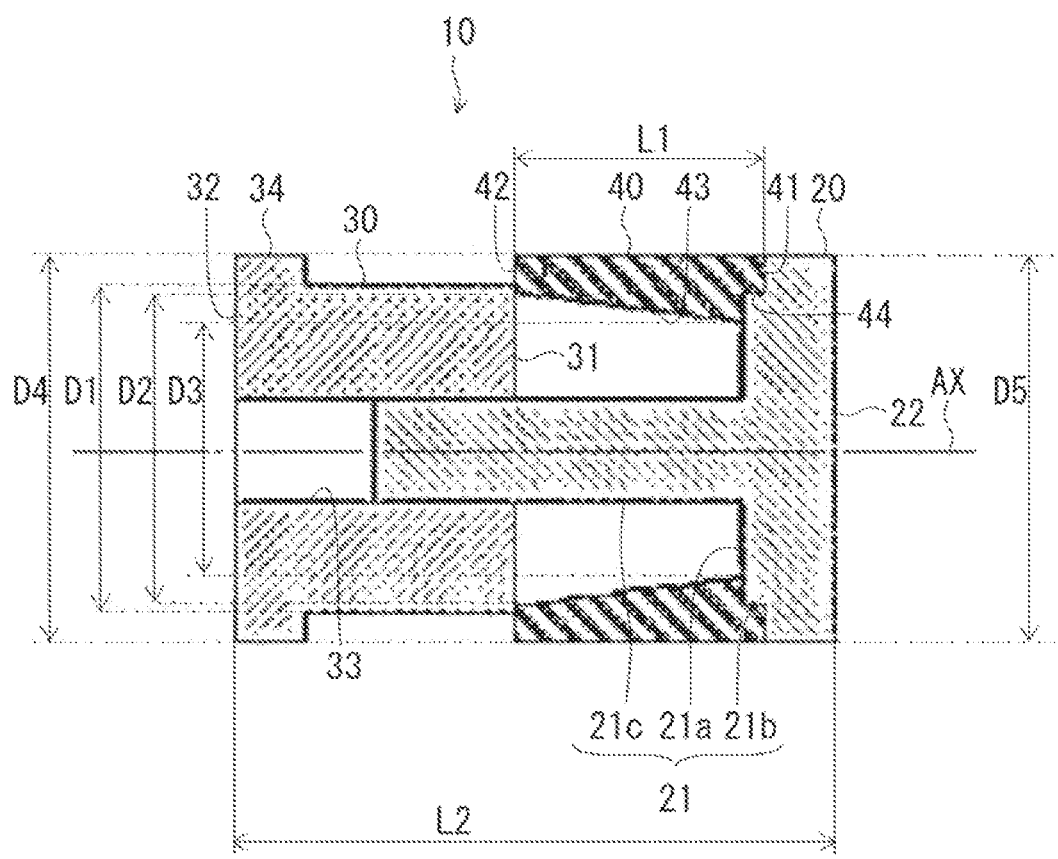
FIG. 3 is a cross-sectional view of the collision energy absorbing apparatus 10 shown in FIG. 1 cut in a plane including the central axis thereof.

FIG. 1 is a perspective view of the collision energy absorbing apparatus 10, and FIG. 2 is an exploded perspective view of the same. FIG. 3 is a cross-sectional view of the collision energy absorbing apparatus 10 shown in FIG. 1 cut in a plane including the central axis thereof.

As shown in FIGS. 1 to 3, the collision energy absorbing apparatus 10 includes an alignment member 20, a pressure member 30, an absorbing member 40, and a guide rod 21c that guides a moving direction of the pressure member 30.

First, the alignment member 20 will be described.

As shown in FIGS. 2 and 3, the alignment member 20 is, for example, a columnar member, and has a surface 21 facing the absorbing member 40 and a surface 22 opposite to the surface 21.

A positioning projection part 21a, which is fitted into a positioning recess part 44 (see FIG. 3) formed in the absorbing member 40, is provided at the center of the surface 21 facing the absorbing member 40. The positioning projection part 21a is, for example, a columnar projection part. The central axis of the positioning projection part 21a coincides with a central axis AX of the alignment member 20.

The material of the alignment member 20 is, for example, a metal resin composite member containing carbon steel for machine structure use (e.g., S10C), a steel plate, CFRP, and the like.

The positioning projection part 21a is fitted into the positioning recess part 44 formed in the absorbing member 40, whereby the absorbing member 40 is attached to the alignment member 20 in a state in which it is positioned.

Specifically, the absorbing member 40 is attached to the alignment member 20 in a state in which the central axis thereof (the central axis of a tapered hole 43 formed in the absorbing member 40) and the central axis AX (the central axis of the guide rod 21c) of the alignment member 20 coincide with each other.

An annular surface 21b with which a front end surface 41 of the absorbing member 40 abuts is provided around the positioning projection part 21a of the surface 21 facing the absorbing member 40. The annular surface 21b is, for example, a plane perpendicular to the central axis AX of the alignment member 20. The central axis of the annular surface 21b coincides with the central axis AX of the alignment member 20.

The guide rod 21c that is fitted into a guide hole 33 formed in the pressure member 30 is provided in the positioning projection part 21a. The guide rod 21c is, for example, a columnar guide rod. The central axis of the guide rod 21c coincides with the central axis AX of the alignment member 20.

The guide rod 21c is fitted into the guide hole 33 formed in the pressure member 30, whereby the pressure member 30 is attached to the alignment member 20 in a state in which it is positioned. Specifically, the pressure member 30 is attached to the alignment member 20 in a state in which the central axis thereof (the central axis of the guide hole 33 formed in the pressure member 30), the central axis AX (the central axis of the guide rod 21c) of the alignment member 20, and the central axis (the central axis of the tapered hole 43 formed in absorbing member 40) of the absorbing member 40 coincide with one another.

Next, the pressure member 30 will be described.

The pressure member 30 is, for example, a columnar member, and has a surface 31 (hereinafter referred to as a front end surface 31) facing the absorbing member 40, and a surface 32 (hereinafter referred to as a rear end surface 32) opposite to the front end surface 31. The front end surface 31 is, for example, a plane perpendicular to the central axis of the pressure member 30. A large-diameter part 34 is provided at the rear end part of the pressure member 30.

A through hole 33 penetrating through the front end surface 31 and the rear end surface 32 is formed in the pressure member 30. The through hole 33 is, for example, a columnar through hole. In the following description, the through hole 33 is also referred to as the guide hole 33. The central axis of the guide hole 33 coincides with the central axis of the pressure member 30. A diameter D1 (see FIG. 3) of the pressure member 30 is set to a value larger than that of a diameter D2 (see FIG. 3) of the tapered hole 43 formed in the absorbing member 40 on a rear end surface 42 side so that the tip part (the front end surface 31) of the pressure member 30 abuts the area around the tapered hole 43 of the absorbing member 40 (the rear end surface 42).

The pressure member 30 is made of a material harder than the material of the absorbing member 40 in order to shear (shear and deform) the absorbing member 40 (an inner wall of the tapered hole 43). The material of the pressure member 30 is, for example, a metal resin composite member containing a super hard material (e.g., cemented carbide), a steel plate, CFRP, and the like.

In the event of a collision, the pressure member 30 is guided by the guide rod 21c and the tip part (the front end surface 31) of the pressure member 30 enters the tapered hole 43 while shearing (shear and deform) the inner wall of the tapered hole 43 formed in the absorbing member 40.

Next, the absorbing member 40 will be described.

The absorbing member 40 is provided between the alignment member 20 and the pressure member 30.

The absorbing member 40 is, for example, a columnar member, and has a surface 41 (hereinafter referred to as the front end surface 41) facing the alignment member 20 and a surface 42 (hereinafter referred to as the rear end surface 42) opposite to the front end surface 41. Each of the front end surface 41 and the rear end surface 42 is, for example, a plane perpendicular to the central axis of the absorbing member 40.

A through hole 43 penetrating through the front end surface 41 and the rear end surface 42 is formed in the absorbing member 40. The through hole 43 is a tapered through hole which narrows from the rear end surface 42 toward the opposite side (the front end surface 41) of it in a frustum shape (e.g., a truncated cone shape). In the following description, the through hole 43 is also referred to as the tapered hole 43. The central axis of the tapered hole 43 coincides with the central axis of the absorbing member 40. The tapered hole 43 includes the positioning recess part 44 into which the positioning projection part 21a provided in the alignment member 20 is fitted.

The material of the absorbing member 40 is, for example, a metal resin composite member containing carbon steel for machine structure use (e.g., S10C), a steel plate, CFRP, and the like.

In the event of a collision, due to the above-described structure of the tapered hole 43, the tip part (the front end surface 31) of the pressure member 30 entering the tapered hole 43 shears (shears and deforms) the absorbing member 40 (the inner wall of the tapered hole 43). In the following description, the part of the absorbing member 40 which the pressure member 30 shears (shears and deforms) is referred to as a predetermined machining margin (a shearing margin and an overlapping margin). Note that, as a result of a test, the inventors of the present disclosure confirmed that when the diameter D1 of the pressure member 30 (the front end surface 31)=the diameter D2 of the tapered hole 43 on the rear end surface 42 side+about 2 mm, it is possible to obtain a good collision energy absorption characteristic.

Next, an example of assembly of the collision energy absorbing apparatus 10 will be described.

First, the absorbing member 40 is attached to the alignment member 20. Specifically, as shown in FIG. 3, in a state in which the front end surface 41 of the absorbing member 40 abuts the annular surface 21b provided in the alignment member 20, the positioning projection part 21a provided in the alignment member 20 is fitted into the positioning recess part 44 formed in the absorbing member 40.

By the above structure, the absorbing member 40 is attached to the alignment member 20 in a state in which it is positioned. Specifically, the absorbing member 40 is attached to the alignment member 20 in a state in which the central axis thereof (the central axis of the tapered hole 43 formed in the absorbing member 40) and the central axis AX (the central axis of the guide rod 21c) of the alignment member 20 coincide with each other.

Next, the pressure member 30 is attached to the alignment member 20. Specifically, as shown in FIG. 3, in a state in which the front end surface 31 of the pressure member 30 abuts the area around the tapered hole 43 of the absorbing member 40 (the rear end surface 42), the guide rod 21c provided in the alignment member 20 is fitted into the guide hole 33 formed in the pressure member 30.

By the above structure, the pressure member 30 is attached to the alignment member 20 in a state in which it is positioned. Specifically, the pressure member 30 is attached to the alignment member 20 in a state in which the central axis thereof (the central axis of the guide hole 33 formed in the pressure member 30), the central axis AX of the alignment member 20 (the central axis of the guide rod 21c), and the central axis (the central axis of the tapered hole 43 formed in absorbing member 40) of the absorbing member 40 coincide with one another.

Next, a description will be given of an operation example of the collision energy absorbing apparatus 10 having the aforementioned structure in the event of a collision.

FIG. 4 is a diagram for explaining an operation example of the collision energy absorbing apparatus 10 in the event of a collision. In FIG. 4, it is assumed that the alignment member 20 is fixed to a vehicle (not shown), and an external force F (a load) is applied in the direction from the left to the right. FIG. 4A shows the initial stage of the collision, and thereafter, the time elapses in the order of FIGS. 4A, 4B, 4C, and 4D.

Figure 4A:
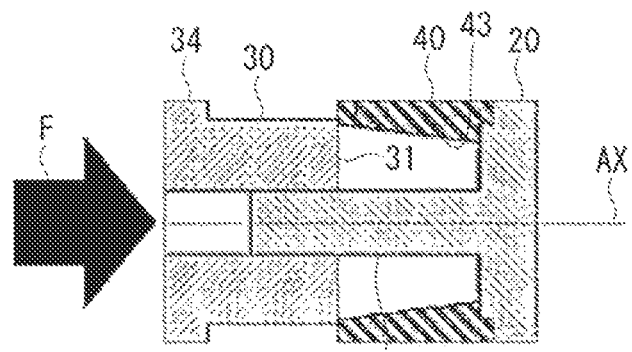
FIG. 4A is a diagram for explaining an operation example of the collision energy absorbing apparatus 10 in the event of a collision.
Figure 4B:
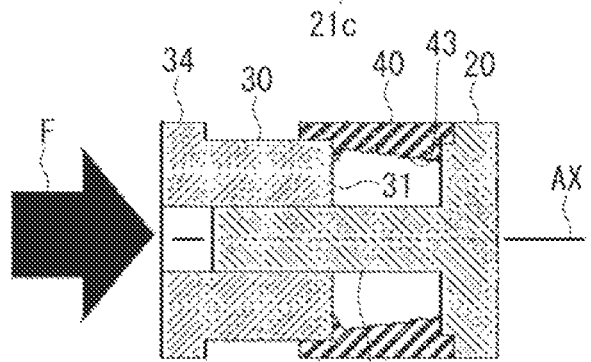
FIG. 4B is a diagram for explaining an operation example of the collision energy absorbing apparatus 10 in the event of a collision.

The front end surface 31 of the pressure member 30 abuts the area around the tapered hole 43 of the absorbing member 40 (the rear end surface 42) (see FIG. 3), the pressure member 30 being made of a material harder than the material of the absorbing member 40. Therefore, as shown in FIG. 4A, when the external force F is applied in the event of a collision, in regard to the pressure member 30, an inner peripheral surface of the through hole 33 thereof is guided by the guide rod 21c (an inner guide type for guiding the inner peripheral surface of the pressure member 30, that is, the inner peripheral surface of the through hole 33), and the tip part (the front end surface 31) of the pressure member 30 enters the tapered hole 43 (so as to overlap it) formed in the absorbing member 40 while shearing (shear and deform) the inner wall of the tapered hole 43 (see FIGS. 4B to 4D).

Figure 4C:
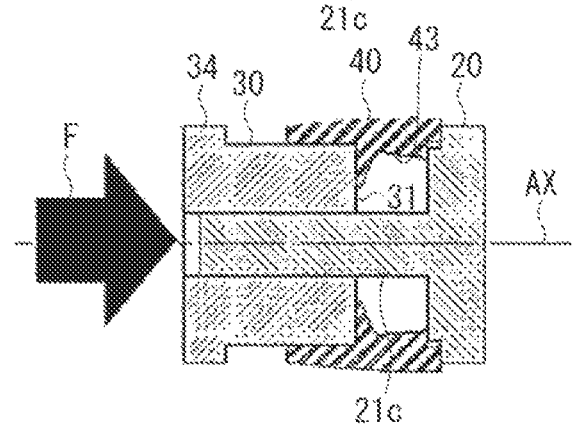
FIG. 4C is a diagram for explaining an operation example of the collision energy absorbing apparatus 10 in the event of a collision.
Figure 4D:
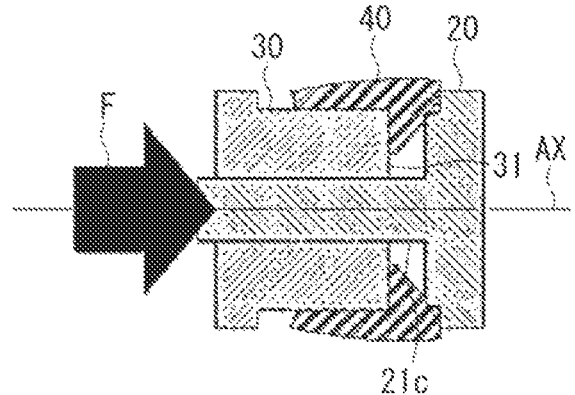
FIG. 4D is a diagram for explaining an operation example of the collision energy absorbing apparatus 10 in the event of a collision.

At this time, since the through hole 43 formed in the absorbing member 40 is a tapered hole, a predetermined machining margin is not reduced (or is hardly reduced) even if the outer diameter of the absorbing member 40 changes (expands) during the process of shear deformation (see FIGS. 4C and 4D). Thus, the predetermined machining margin is not reduced (or almost no reduction), and the collision energy can be absorbed while the predetermined machining margin is continuously shear-deformed. Further, since the moving direction of the pressure member 30 is guided by the alignment member 20 (the guide rod 21c), the pressure member 30 and the absorbing member 40 are not misaligned, and the predetermined machining margin can be continuously and satisfactorily shear-deformed to absorb collision energy.

As described above, in the event of a collision, the tip part (the front end surface 31) of the pressure member 30 enters the tapered hole 43 while shearing (shear and deform) the inner wall of the tapered hole 43 formed in the absorbing member 40, whereby it is possible to absorb collision energy. Note that the accumulation of the plastic deformation force when the pressure member 30 shears and deforms the absorbing member 40 corresponds to the absorbed energy.

Next, the effect of the collision energy absorbing apparatus 10 having the aforementioned structure will be described with reference to Examples 1 to 3 and a comparative example.

Figure 7:
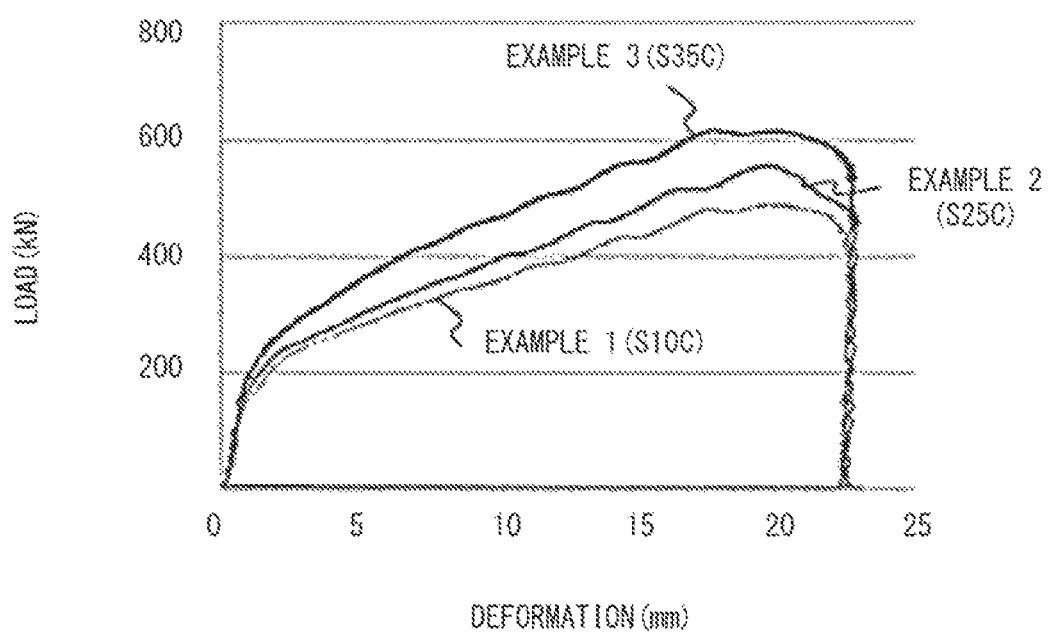
FIG. 7 shows a load displacement curve in each of Examples 1 to 3.
Figure 8A:
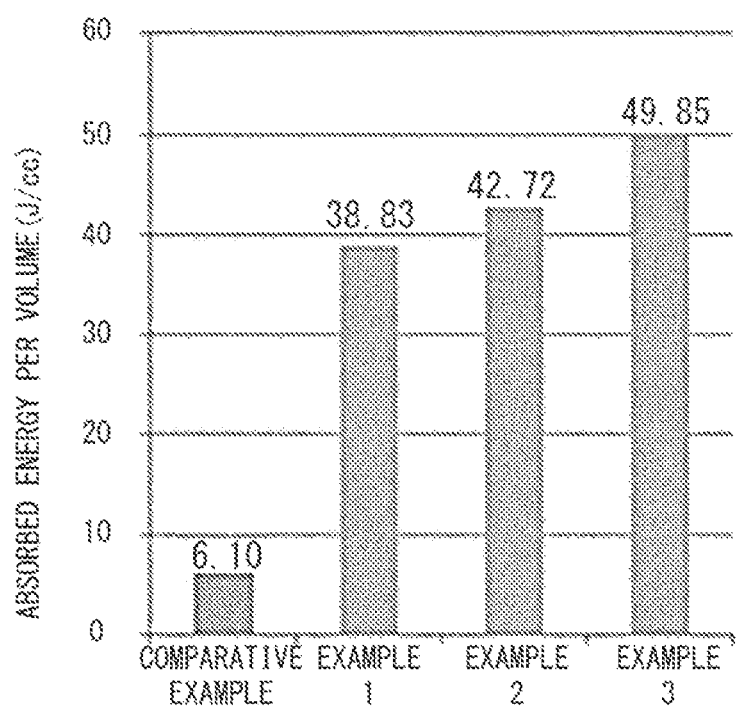
FIG. 8A is a bar graph showing absorbed energy per volume in FIG. 6.
Figure 8B:
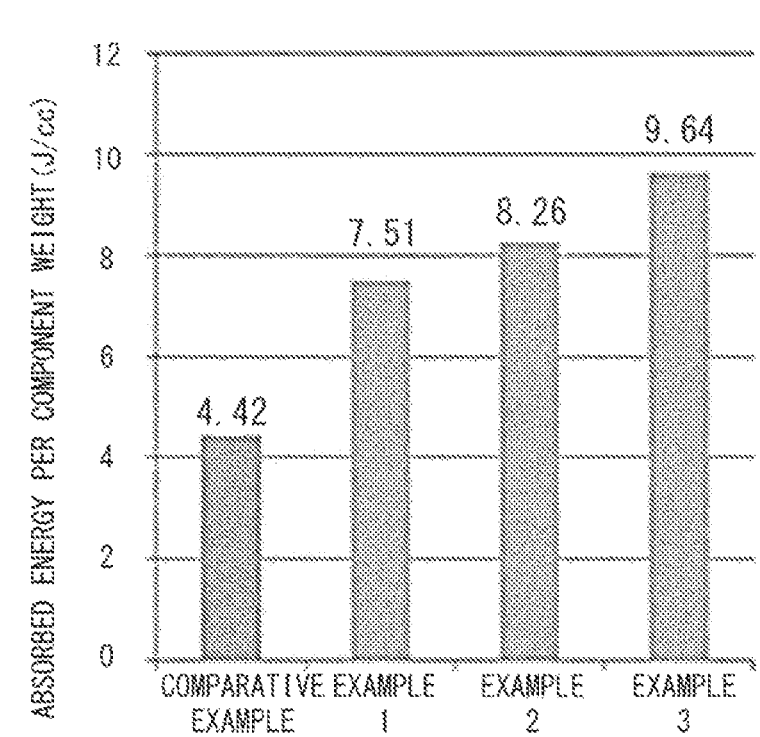
FIG. 8B is a bar graph showing absorbed energy per mass in FIG. 6.

FIG. 5 is a table summarizing the materials, sizes, and the like of the collision energy absorbing apparatus 10 and its components used in Examples 1 to 3. FIG. 6 is a table summarizing the volume and the like of the collision energy absorbing apparatus 10 and its components used in the comparative example and Examples 1 to 3. FIG. 7 shows a load displacement curve in each of Examples 1 to 3. FIG. 8A is a bar graph showing absorbed energy per volume in FIG. 6, and FIG. 8B is a bar graph showing absorbed energy per mass in FIG. 6.

In Examples 1 to 3, the collision energy absorbing apparatus having the structure shown in FIGS. 1 to 3 was used.

The materials of the members used in Examples 1 to 3 were as shown in the table of FIG. 5. That is, as shown in FIG. 5, in each of Examples 1 to 3, the material of the pressure member 30 was a super hard material (e.g., cemented carbide). Meanwhile, the material of the alignment member 20 and the material of the absorbing member 40 used in Example 1 were both carbon steel (S10C) having hardness lower than that of the super hard material. The material of the alignment member 20 and the material of the absorbing member 40 used in Example 2 were both carbon steel (S25C) having hardness higher than that of carbon steel (S10C). The material of the alignment member 20 and the material of the absorbing member 40 used in Example 3 were both carbon steel (S35C) having hardness higher than that of carbon steel (S25C).

The sizes (diameters D1 to D5 and lengths L1 and L2 in FIG. 3) of the collision energy absorbing apparatus 10 and its components used in Examples 1 to 3 were as shown in the table of FIG. 5. That is, as shown in FIG. 5, in each of Examples 1 to 3, the diameter D1 of the pressure member 30 was 46.8 mm, the diameter D2 of the tapered hole 43 (on the rear end surface side) was 44.8 mm, the diameter D3 of the tapered hole 43 (on the front end surface side) was 36.54 mm, the diameter D4 of the absorbing member 40 was 55.2 mm, the maximum diameter D5 of the alignment member 20 was 59.5 mm, the axial length L1 of the absorbing member 40 was 34 mm, and the axial length L2 of the collision energy absorbing apparatus 10 was 74 mm.

The volume and the like of the collision energy absorbing apparatus 10 used in Examples 1 to 3 were as shown in the table of FIG. 6. That is, as shown in FIG. 6, in each of Examples 1 to 3, the volume of the collision energy absorbing apparatus 10 was 206 cc and the mass of the same was 1,065 g. Note that the volume of 206 cc used in Examples 1 to 3 was determined by the area of the maximum diameter D5 part (D5=59.5 mm) of the alignment member 20×the axial length L2 (L2=74 mm) of the collision energy absorbing apparatus 10. Further, absorbed energy (J) was obtained by integrating displacement mm up to 20 mm×a load kN, where J=Nm=kNmm.

The load displacement curves in Examples 1 to 3 were as shown in FIG. 7.

In the comparative example, the crash box (the example 2 of the invention) disclosed in Japanese Unexamined Patent Application Publication No. 2011-63191 was used.

The volume and the like of the crash box used in the comparative example were as shown in the table of FIG. 6. That is, as shown in FIG. 6, in the comparative example, the volume of the crash box was 1,500 cc and the mass of the same was 2,070 g. Note that the volume of 1,500 cc used in the comparative example was calculated by adding the volume (about 1,425.9 cc) of the main body of the crash box (the example 2 of the invention) to the volume (about 75.5 cc) of the bottom plate of the crash box. At this time, the volume (about 1,425.9 cc) of the main body of the crash box (the example 2 of the invention) and the volume (about 75.5 cc) of the bottom plate of the crash box were calculated based on the respective values disclosed in Japanese Unexamined Patent Application Publication No. 2011-63191.

Figure 17:
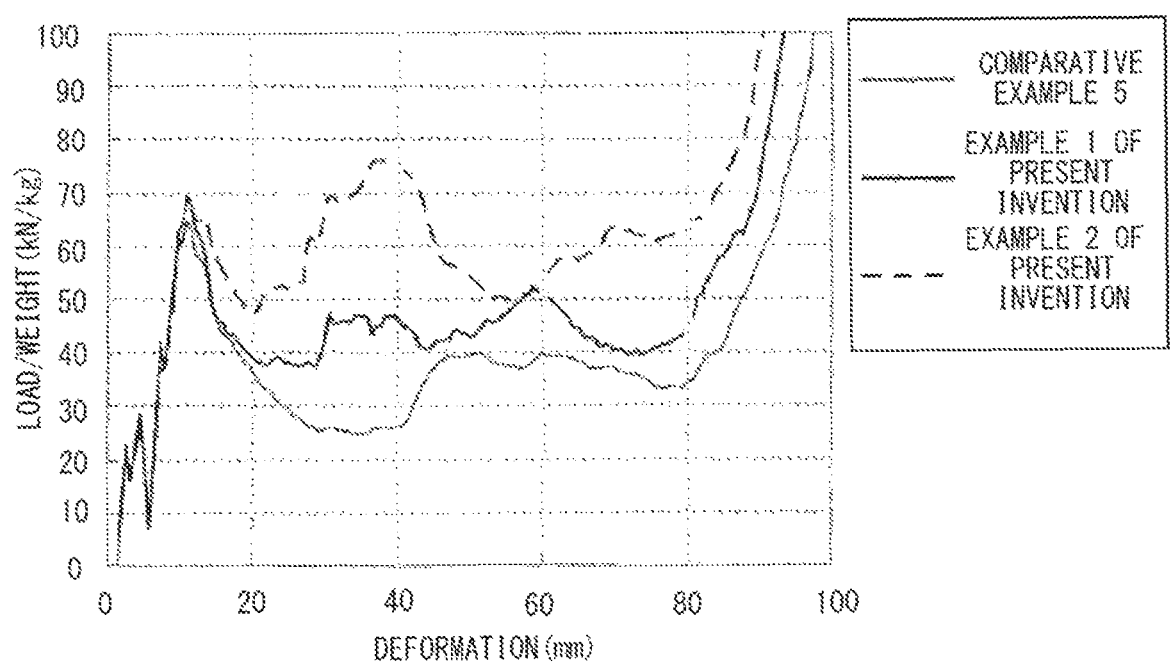
FIG. 17 shows a load variation curve of the collision energy absorbing apparatus disclosed in Japanese Unexamined Patent Application Publication No. 2011-63191.

The load displacement curve in the comparative example was as shown in FIG. 17 (see EXAMPLE 2 OF PRESENT INVENTION in FIG. 17).

Referring to FIG. 17, it can be seen that in the comparative example, it is impossible to suppress the peak load at the initial stage of a collision and a load drop (i.e., reduce the amount of drop from the peak load) immediately after it (see EXAMPLE 2 OF PRESENT INVENTION in FIG. 17). On the contrary, referring to FIG. 7, it can be seen that in Examples 1 to 3, it is possible to suppress the peak load at the initial stage of a collision and a load drop (i.e., reduce the amount of drop from the peak load) immediately after it, whereby it is possible to very satisfactorily absorb collision energy.

Further, referring to FIG. 6, it can be seen that the collision energy absorbing apparatus 10 used in each of Examples 1 to 3 had a small volume (it was not bulky and was compact) and a small mass (it was lightweight) as compared to those in the comparative example.

Further, referring to FIGS. 6 and 8A, it can be seen that the absorbed energy per volume of the collision energy absorbing apparatus 10 used in each of Examples 1 to 3 was larger than that in the comparative example. Further, referring to FIGS. 6 and 8B, it can be seen that the absorbed energy per mass of the collision energy absorbing apparatus 10 used in each of Examples 1 to 3 was larger than that in the comparative example. That is, it can be seen that the absorbed energy of the collision energy absorbing apparatus 10 used in each of Examples 1 to 3 was larger than that in the comparative example in spite of its smaller volume and mass.

As described above, in the collision energy absorbing apparatus 10 used in each of Examples 1 to 3, it is possible to suppress the peak load at the initial stage of a collision and a load drop (i.e., reduce the amount of drop from the peak load) immediately after it, whereby it is possible to very satisfactorily absorb collision energy. Further, referring to FIGS. 6 and 7, it can be seen that the higher the material strength (hardness) of the absorbing member 40 used, the more the absorbing energy increased.

Next, an example in which the collision energy absorbing apparatus 10 is mounted on a vehicle will be described.

Figure 9:
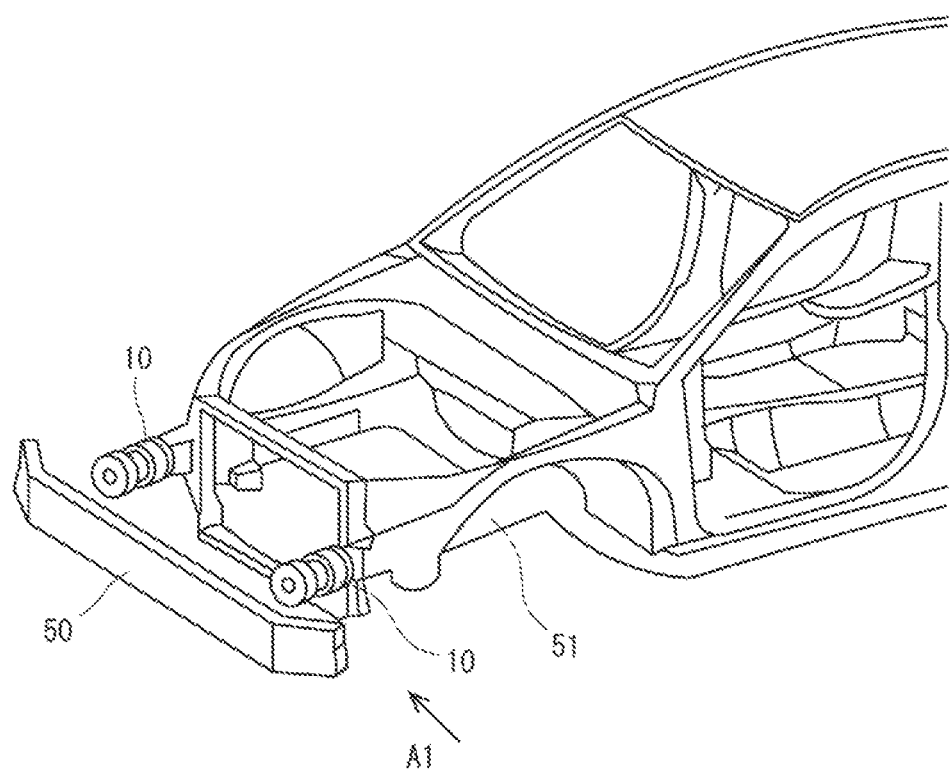
FIG. 9 shows an example in which the collision energy absorbing apparatus 10 is mounted on a front end part of a vehicle.
Figure 10:
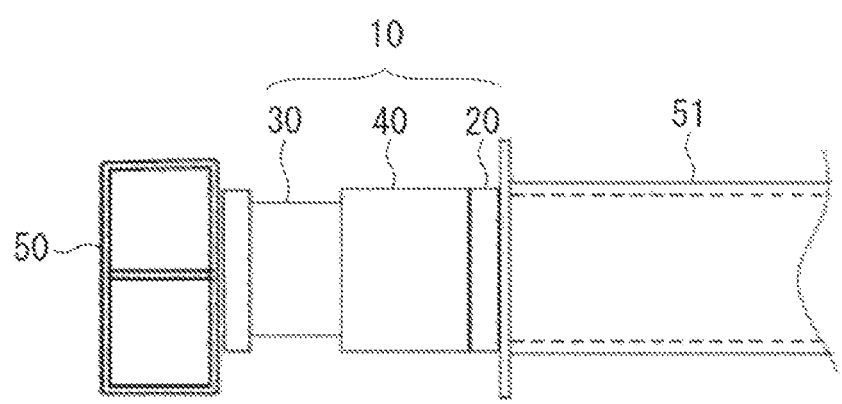
FIG. 10 is a partially enlarged view of FIG. 9 (a partially enlarged view as viewed from the direction of an arrow A1 in FIG. 9)

FIG. 9 shows an example in which the collision energy absorbing apparatus 10 is mounted on a front end part of a vehicle. FIG. 10 is a partially enlarged view of FIG. 9 (a partially enlarged view as viewed from the direction of an arrow A1 in FIG. 9).

As shown in FIGS. 9 and 10, by disposing the collision energy absorbing apparatus 10 at the front end part of the vehicle, for example, between a bumper reinforcement 50 and a front side member 51, it is possible to absorb the collision energy input from the front of the vehicle in the event of a collision. Further, although not shown in FIGS. 9 and 10, by disposing the collision energy absorbing apparatus 10 at the rear end part of the vehicle, it is possible to absorb the collision energy input from the rear of the vehicle in the event of a collision.

Figure 11:
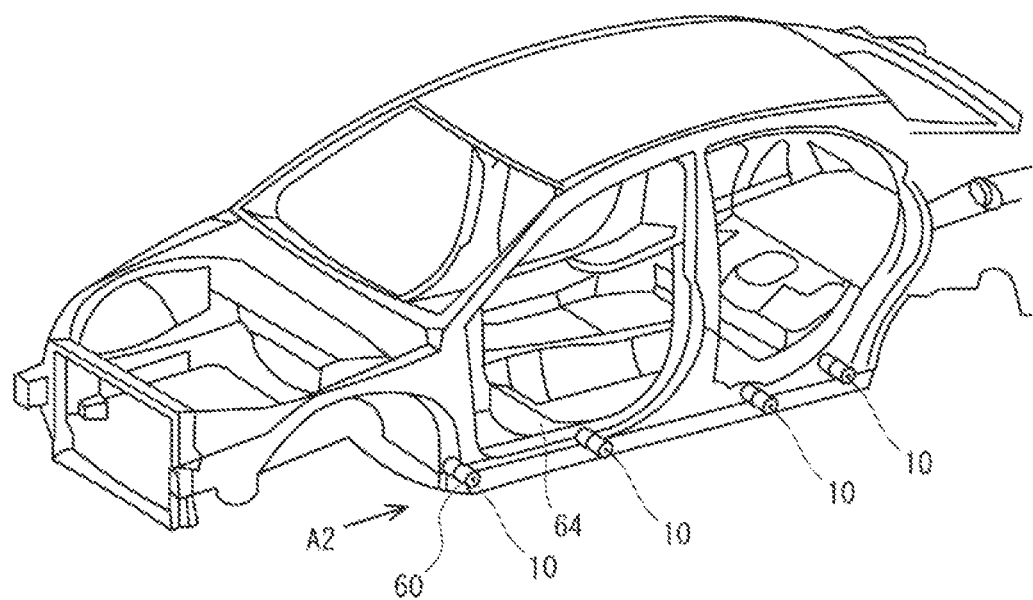
FIG. 11 shows an example in which the collision energy absorbing apparatus 10 is mounted on a side part of the vehicle.
Figure 12:
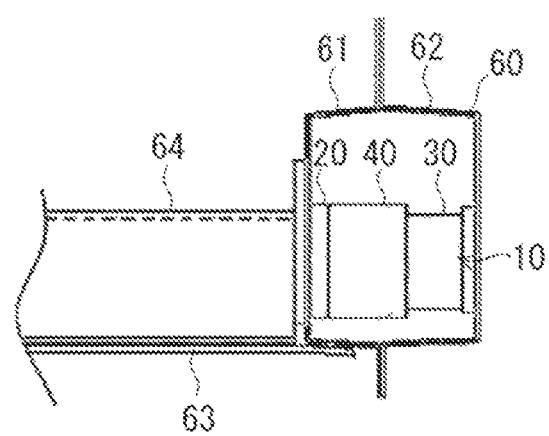
FIG. 12 is a partially enlarged view of FIG. 11 (a partially enlarged view as viewed from the direction of an arrow A2 in FIG. 11)

FIG. 11 shows an example in which the collision energy absorbing apparatus 10 is mounted on a side part of the vehicle. FIG. 12 is a partially enlarged view of FIG. 11 (a partially enlarged view as viewed from the direction of an arrow A2 in FIG. 11).

As shown in FIGS. 11 and 12, by disposing (e.g., by arranging in parallel to each other) the collision energy absorbing apparatuses 10 on the side part of the vehicle, for example, in a rocker 60 (between an rocker inner 61 and a rocker outer 62), it is possible to absorb collision energy input from the side of the vehicle in the event of a collision (a side collision). Note that in FIGS. 11 and 12, a reference numeral 63 denotes a floor, and a reference numeral 64 denotes a floor cross.

As described above, according to this embodiment, it is possible to provide the collision energy absorbing apparatus 10 capable of suppressing the peak load at the initial stage of a collision and a load drop (i.e., reduce the amount of drop from the peak load) immediately after it.

This is because, in the event of a collision, the pressure member 30 is guided by the guide rod 21c and the tip part (the front end surface 31) of the pressure member 30 enters the tapered hole 43 while shearing the inner wall of the tapered hole 43 formed in the absorbing member 40, to thereby absorb collision energy.

Further, according to this embodiment, it is possible to provide the collision energy absorbing apparatus 10 having a small volume (i.e., the collision energy absorbing apparatus 10 that is not bulky and is compact) and a small mass (i.e., the collision energy absorbing apparatus 10 that is lightweight) as compared to those of the comparative example.

Further, according to this embodiment, by adjusting the shape of the absorbing member 40 (e.g., the tapered hole 43), it is possible to easily control a load-displacement characteristic at the time of absorbing collision energy.

For example, by forming the through hole 40 formed in the absorbing member 40 in a shape (not a simple tapered shape) partially having an undercut shape and reducing a predetermined machining margin, the load can be reduced. Further, when the through hole 43 formed in the absorbing member 40 is formed in a simple tapered shape, the load-displacement characteristic at the time of absorbing collision energy rises toward the right as shown in FIG. 7. However, by adjusting the shape of the absorbing member 40 (e.g., the tapered hole 43), it is possible to maintain a constant load. Further, by increasing the predetermined machining margin, it is possible to make the load-displacement characteristic at the time of absorbing collision energy rise toward the right with a larger inclination. Further, by adjusting the shape of the absorbing member 40 (e.g., the tapered hole 43), it is possible to control the relation between the entering stroke and the absorbed energy.

Further, according to this embodiment, by adjusting the material strength (e.g., the hardness) of the absorbing member 40, it is possible to control the total amount of collision energy to be absorbed.

For example, by using a material (e.g., S45C) having a strength higher than those of S10C, S25C, and S35C, it is possible to increase the total amount of absorbed energy. Further, by combining a plurality of strength materials to constitute the absorbing member 40, the load-displacement characteristics can be varied.

Further, according to this embodiment, the collision energy absorbing apparatus 10 can be applied to a crash box that is disposed at the front end part and the rear end part of the vehicle and is capable of absorbing collision energy input from the front and the rear of the vehicle in the event of a collision.

Further, according to this embodiment, the collision energy absorbing apparatuses 10 can be arranged in parallel to each other on the side part of the vehicle by taking advantage of the characteristic of the collision energy absorbing apparatus 10 that the collision energy can be absorbed in a compact and short stroke, whereby it is possible to absorb collision energy input from the side of the vehicle in the event of a collision (a side collision).

Next, a modified example will be described.

Figure 13:
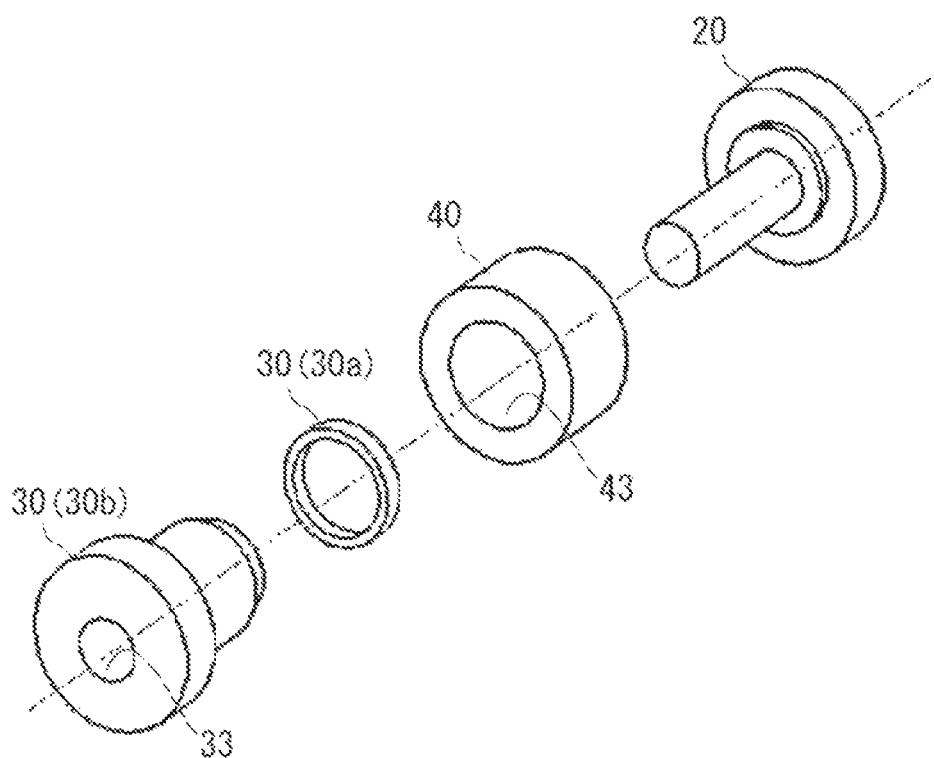
FIG. 13 is an exploded perspective view of the collision energy absorbing apparatus 10 using a pressure member 30 (a modified example)

FIG. 13 is an exploded perspective view of the collision energy absorbing apparatus 10 using the pressure member 30 (the modified example).

In the above embodiment, the example in which the pressure member 30 is entirely made of a material harder than the material of the absorbing member 40 has been described, but it is merely an example. For example, as shown in FIG. 13, the pressure member 30 may comprise a tip part 30a that shears and deforms the absorbing member 40 and a pressure member body 30b to which the tip part 30a is attached. In this case, only the tip part 30a may be made of a material harder than the material of the absorbing member 40.

Although a hard material is generally expensive, by forming only the tip part 30a that shears and deforms the absorbing member 40 with a material harder than the material of the absorbing member 40 as described above, it is possible to manufacture the collision energy absorbing apparatus 10 at a low cost as compared to the case where the pressure member 30 is entirely made of a material harder than the material of the absorbing member 40.

Figure 14:
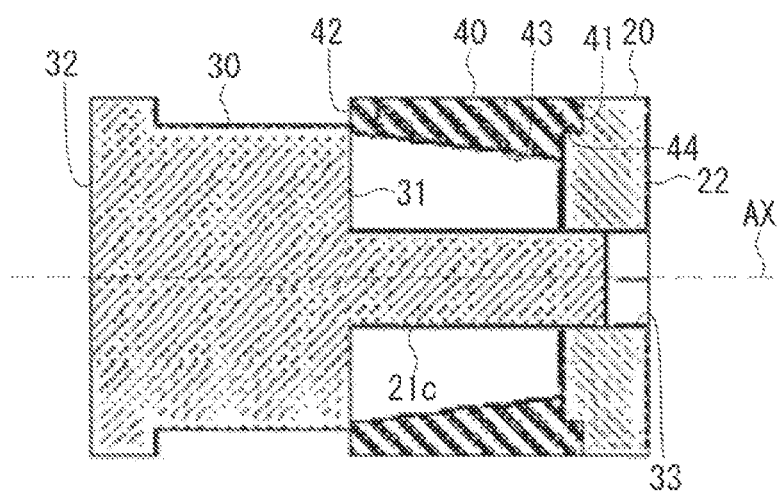
FIG. 14 is a cross-sectional view of the collision energy absorbing apparatus 10 using an alignment member 20 (the modified example) and the pressure member 30 (the modified example)

FIG. 14 is a cross-sectional view of the collision energy absorbing apparatus 10 using the alignment member 20 (the modified example) and the pressure member 30 (the modified example).

In the above embodiment, a description has been given of the example (see FIG. 3) in which the guide rod 21c is provided in the alignment member 20 and the guide hole 33 into which the guide rod 21c is fitted is formed in the pressure member 30, but it is merely an example. For example, as shown in FIG. 14, conversely, the guide rod 21c may be provided in the pressure member 30 and the guide hole 33 into which the guide rod 21c is fitted may be formed in the alignment member 20.

Figure 15:
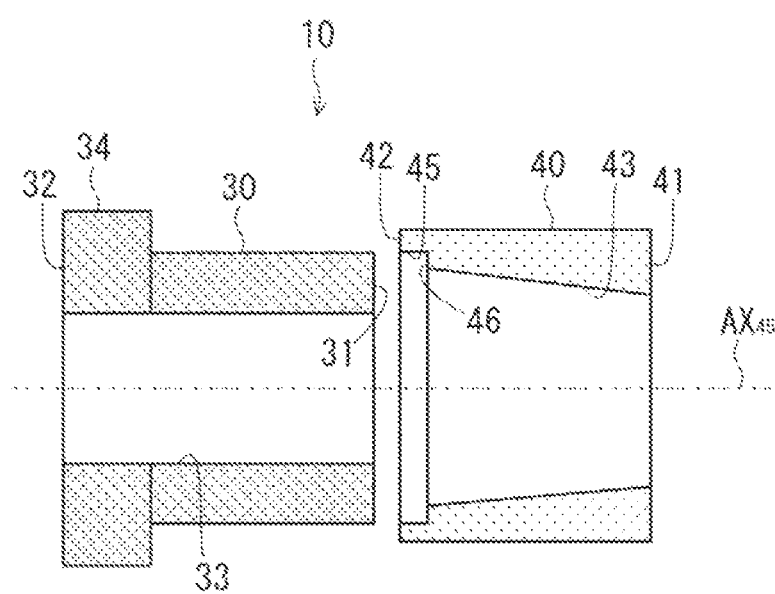
FIG. 15 is a cross-sectional view of the collision energy absorbing apparatus 10 that does not include the alignment member 20.

FIG. 15 is a cross-sectional view of the collision energy absorbing apparatus 10 that does not include the alignment member 20.

The collision energy absorbing apparatus 10 according to this modified example does not include the alignment member 20 and the positioning recess part 44 provided in the alignment member 20 into which the positioning projection part 21a is fitted.

Meanwhile, a recess part 45 into which the tip part of the pressure member 30 is fitted is provided in the tapered hole 43 formed in the absorbing member 40. A bottom surface 46 of the recess part 45 is, for example, a plane perpendicular to a central axis $AX_{45}$ of the recess part 45.

The central axis $AX_{45}$ of the recess part 45 and the central axis (the central axis of the tapered hole 43 formed in absorbing member 40) of the absorbing member 40 coincide with each other.

Figure 16:
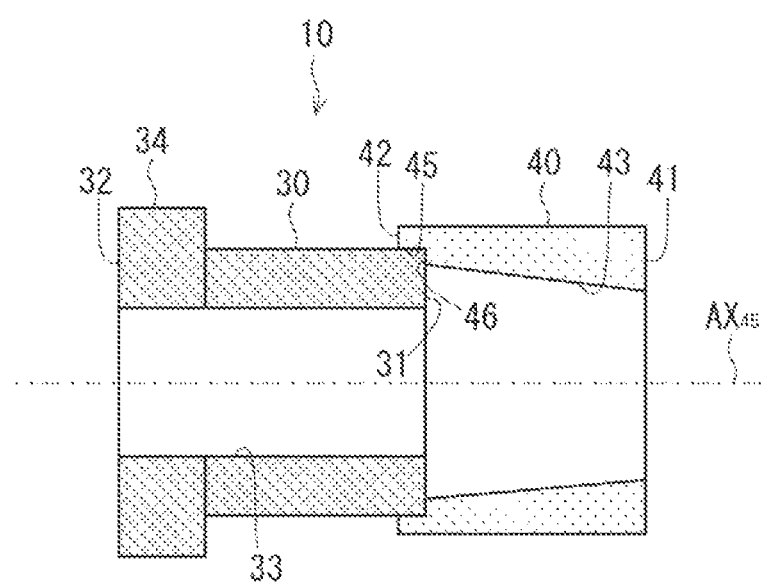
FIG. 16 is a cross-sectional view of the collision energy absorbing apparatus 10 in which the pressure member 30 is attached to an absorbing member 40.

FIG. 16 is a cross-sectional view of the collision energy absorbing apparatus 10 in which the pressure member 30 is attached to the absorbing member 40.

As shown in FIG. 16, the tip part of the pressure member 30 is fitted into the recess part 45 provided in the absorbing member 40 in a state in which the front end surface 31 of the pressure member 30 abuts the bottom surface 46 of the recess part 45 provided in the absorbing member 40, whereby the pressure member 30 is attached to the absorbing member 40 in a state in which it is positioned. In this state, the central axis of the pressure member 30 and the central axis (the central axis of the tapered hole 43 formed in the absorbing member 40) of the absorbing member 40 coincide with each other.

Next, an operation example of the collision energy absorbing apparatus 10 according to this modified example in the event of a collision will be described.

The front end surface 31 of the pressure member 30 abuts the bottom surface 46 of the recess part 45 provided in the absorbing member 40 (see FIG. 16), the pressure member 30 being made of a material harder than the material of the absorbing member 40. Therefore, when the external force F is applied in the event of a collision, in regard to the pressure member 30, an outer peripheral surface thereof is guided by the recess part 45 provided in the absorbing member 40 (an outer guide type for guiding the outer peripheral surface of the pressure member 30) as in the case shown in FIG. 4A and the tip part (the front end surface 31) of the pressure member 30 enters the tapered hole 43 (so as to overlap it) formed in the absorbing member 40 while shearing (shear and deform) the inner wall of the tapered hole 43 as in the cases shown in FIGS. 4B to 4D.

At this time, since the through hole 43 formed in the absorbing member 40 is a tapered hole, a predetermined machining margin is not reduced (or is hardly reduced) even if the outer diameter of the absorbing member 40 changes (expands) during the process of shear deformation as in the cases shown in FIGS. 4C and 4D. Thus, the predetermined machining margin is not reduced (or almost no reduction), and the collision energy can be absorbed while the predetermined machining margin is continuously shear-deformed. Further, since the moving direction of the pressure member 30 is guided by the recess part 45 provided in the absorbing member 40, the pressure member 30 and the absorbing member 40 are not misaligned, and the predetermined machining margin can be continuously and satisfactorily shear-deformed to absorb collision energy.

As described above, in the event of a collision, the tip part (the front end surface 31) of the pressure member 30 enters the tapered hole 43 formed in the absorbing member 40 while shearing (shear and deform) the inner wall of the tapered hole 43, whereby the collision energy absorbing apparatus 10 according to this modified example can absorb collision energy as in the case of the collision energy absorbing apparatus 10 according to the above embodiment.

The inventors of the present disclosure confirmed by experiment that the collision energy absorbing apparatus 10 according to this modified example can obtain the same collision energy absorption characteristic as that of the collision energy absorbing apparatus 10 according to the above embodiment.

By the collision energy absorbing apparatus 10 according to this modified example, in addition to the effects of the above embodiment, it is possible to reduce the number of components constituting the collision energy absorbing apparatus 10 and the weight thereof, because the alignment member 20 is not included.

Note that in the collision energy absorbing apparatus 10 according to this modified example, although the pressure member 30 having the through hole 33 formed therein is used, the pressure member 30 having no through hole 33 formed therein may be used.

The numerical values shown in the above embodiment are all examples, and it is of course possible to use appropriate numerical values different from these values.

The above embodiment is in all respects merely an example. The present disclosure is not limited by the description of the above embodiment. The present disclosure can be implemented in various other ways without departing from its spirit or main feature.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A collision energy absorbing apparatus configured to absorb collision energy, the collision energy absorbing apparatus being mounted on a vehicle and comprising a pressure member, an absorbing member, and a guide part that guides a moving direction of the pressure member, wherein
a hole through which the pressure member guided and moved by the guide part enters is formed in the absorbing member,
in an event of a collision, the pressure member is guided by the guide part and a tip part of the pressure member enters the hole formed in the absorbing member while shearing an inner wall of the hole, to thereby absorb collision energy wherein
the absorbing member is provided between the alignment member and the pressure member, and
a diameter of the pressure member is set to be larger than a diameter of the hole so that the pressure member abuts an area around the hole of the absorbing member.

2. The collision energy absorbing apparatus according to claim 1, wherein
the guide part is a guide rod provided in the alignment member, and
a guide hole into which the guide rod is fitted is formed in the pressure member.

3. The collision energy absorbing apparatus according to claim 2, wherein a central axis of the guide hole formed in the pressure member, a central axis of the hole formed in the absorbing member, and a central axis of the guide rod coincide with one another.

4. The collision energy absorbing apparatus according to claim 1, wherein
the guide part is a guide rod provided in the pressure member, and a guide hole into which the guide rod is fitted is formed in the alignment member.

5. The collision energy absorbing apparatus according to claim 4, wherein a central axis of the guide hole formed in the pressure member, a central axis of the hole formed in the absorbing member, and a central axis of the guide rod coincide with one another.

6. The collision energy absorbing apparatus according to claim 1, wherein the guide part is a recess part provided in the hole, and the tip part of the pressure member is fitted into the recess part in a state in which a front end surface of the pressure member abuts a bottom surface of the recess part.

7. The collision energy absorbing apparatus according to claim 6, wherein a central axis of the pressure member and the central axis of the hole formed in the absorbing member coincide with each other.

8. The collision energy absorbing apparatus according to claim 1, wherein the hole is a tapered hole which narrows in a frustum shape from a side of the absorbing member facing the pressure member to a side of the absorbing member opposite to the side thereof facing the pressure member.

9. The collision energy absorbing apparatus according to claim 1, wherein at least the tip part of the pressure member is made of a material harder than the material of the absorbing member.

10. The collision energy absorbing apparatus according to claim 9, wherein the pressure member comprises the tip part and a pressure member body to which the tip part is attached.

\* \* \* \* \*